May 12, 1942.　　　　J. DOLZA　　　　2,282,949
VACUUM CONTROL OF CLUTCH CAPACITY
Filed Oct. 18, 1937　　　7 Sheets-Sheet 2

Inventor
John Dolza
By Blackmore, Spencer & Flint
Attorneys

May 12, 1942.  J. DOLZA  2,282,949
VACUUM CONTROL OF CLUTCH CAPACITY
Filed Oct. 18, 1937  7 Sheets-Sheet 5

Inventor
John Dolza
By Blackwood, Spencer & Flint
Attorneys

May 12, 1942.  J. DOLZA  2,282,949
VACUUM CONTROL OF CLUTCH CAPACITY
Filed Oct. 18, 1937  7 Sheets-Sheet 6

Inventor
John Dolza
By Blackmore, Spencer & Flint
Attorneys

May 12, 1942.　　　　J. DOLZA　　　　2,282,949
VACUUM CONTROL OF CLUTCH CAPACITY
Filed Oct. 18, 1937　　　　7 Sheets-Sheet 7

Inventor
John Dolza
By Blackmore, Spencer & Flint
Attorneys

Patented May 12, 1942

2,282,949

UNITED STATES PATENT OFFICE 2,282,949

VACUUM CONTROL OF CLUTCH CAPACITY

John Dolza, Flint, Mich., assignor to General Motors Corporation, Detroit, Mich., a corporation of Delaware Application October 18, 1937, Serial No. 169,535

14 Claims. (Cl. 192—.01)

The invention relates to the control of variable speed ratio in transmissions driven by engines and connected to a varying load, more particularly to present day motor vehicles which are driven by internal combustion engines, and are equipped with step ratio gears requiring transfer of torque from one of a group of driving paths to another.

It relates further to mechanism for automatically selecting speed ratio, and more particularly to forms of transmissions in which the transition interval occurs without full release of torque, or with torque overlap.

An object of my invention is the establishing of a shift sequence in which exceptionally smooth transfer of torque is provided by the coordination of fluid pressure ratio shifting means with regulatory means subject to a measure of torque or to torque demand.

A further object is the providing of regulatory means instantly available and operative at the will of the operator to modify the establishing of drive in a given shift interval according to the existing degree of engine torque.

An additional object is the provision of means subject to the degree of engine intake manifold vacuum applied to the controls regulating the engagement of drive during the shift interval, whereby predetermined forces acting on fluid pressure valving are correlated with the driving conditions.

Other objects and advantages to be derived from the use of the invention herein disclosed reside in the interrelation and methods of operation of the parts described, and will become apparent upon inspection of the following specification when read with reference to the accompanying drawings wherein the preferred embodiments of the invention are illustrated.

It is expressly understood, however, that the drawings are for the purpose of illustration only, and are not to be taken as a definition of the limits of the invention, reference hereunder being noted for this purpose to the appended claims.

Figure 1:
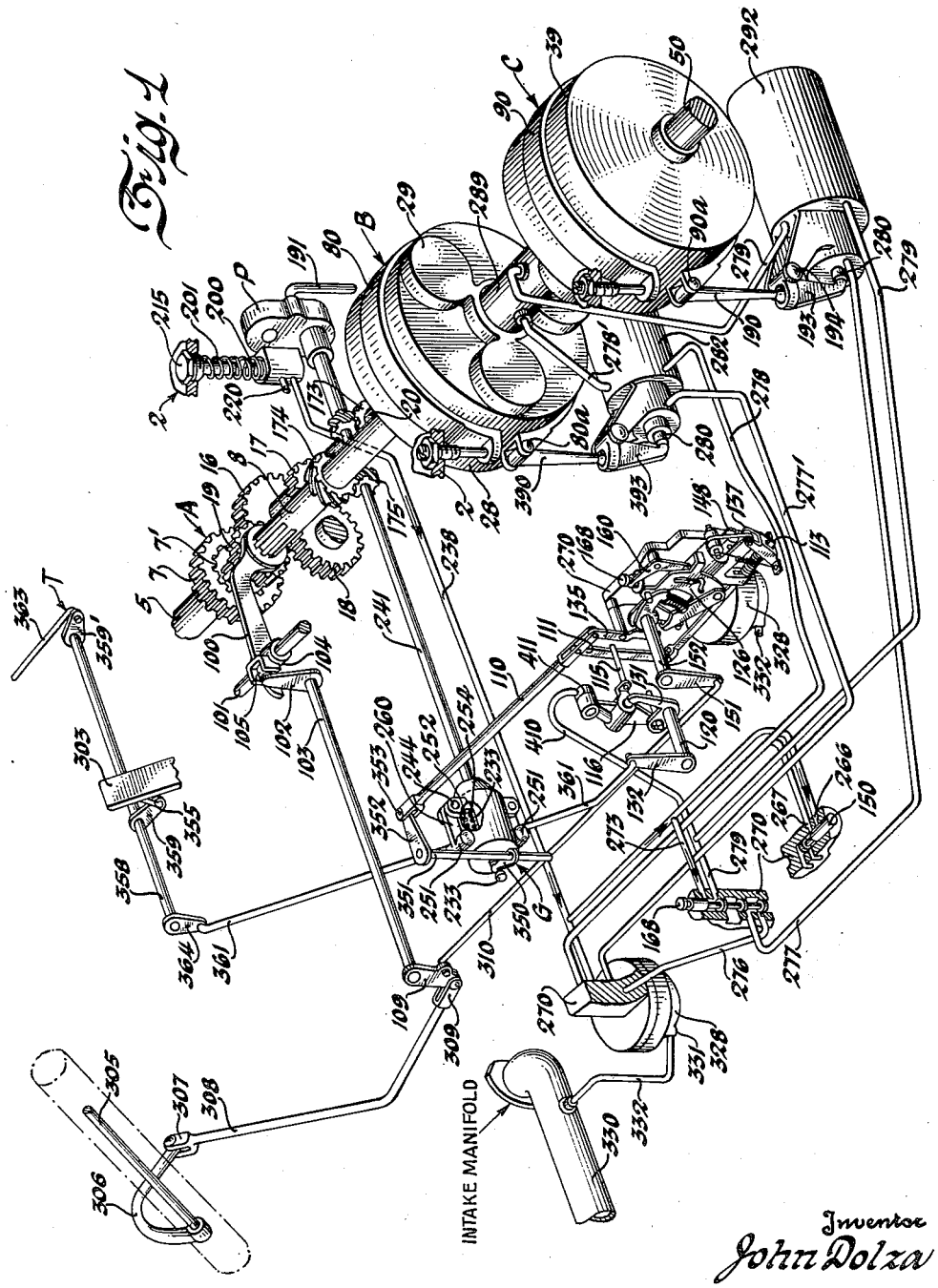
Figure 1 is a stereographic sectioned projection of a transmission installation in a motor vehicle, showing the sequence arrangement of units from engine to load shaft diagonally from left to right.

In Figure 1 the projected schematic sectioned view of the transmission assembly of my example discloses a first variable speed unit adjacent the engine connected main clutch shaft 5, having output shaft 8 carrying splined gear 19 engageable with reverse idler gear 18, or with jaws 7' of gear 7 integral with shaft 5, and constantly meshed with countershaft gear 16 rotatable with gear 17 driving reverse idler gear 18. Countershaft body 20 rotates a first gear 173 of the servo pump drive assembly, hereinafter designated by letter P, and shaft 8 drives a second gear 174 of the servo pump drive assembly, to be described later. Body 20 rotates on 15.

Gear 19 is shifted axially by fork 100 attached to slider 104 of rod 101, and rocker 102 moving in slide 105, the shaft 103 of rocker 102 projecting externally from the casing 2. The above head gearset assembly constitutes a forward-neutral-reverse shifting unit, hereinafter designated by letter A.

Figure 2:
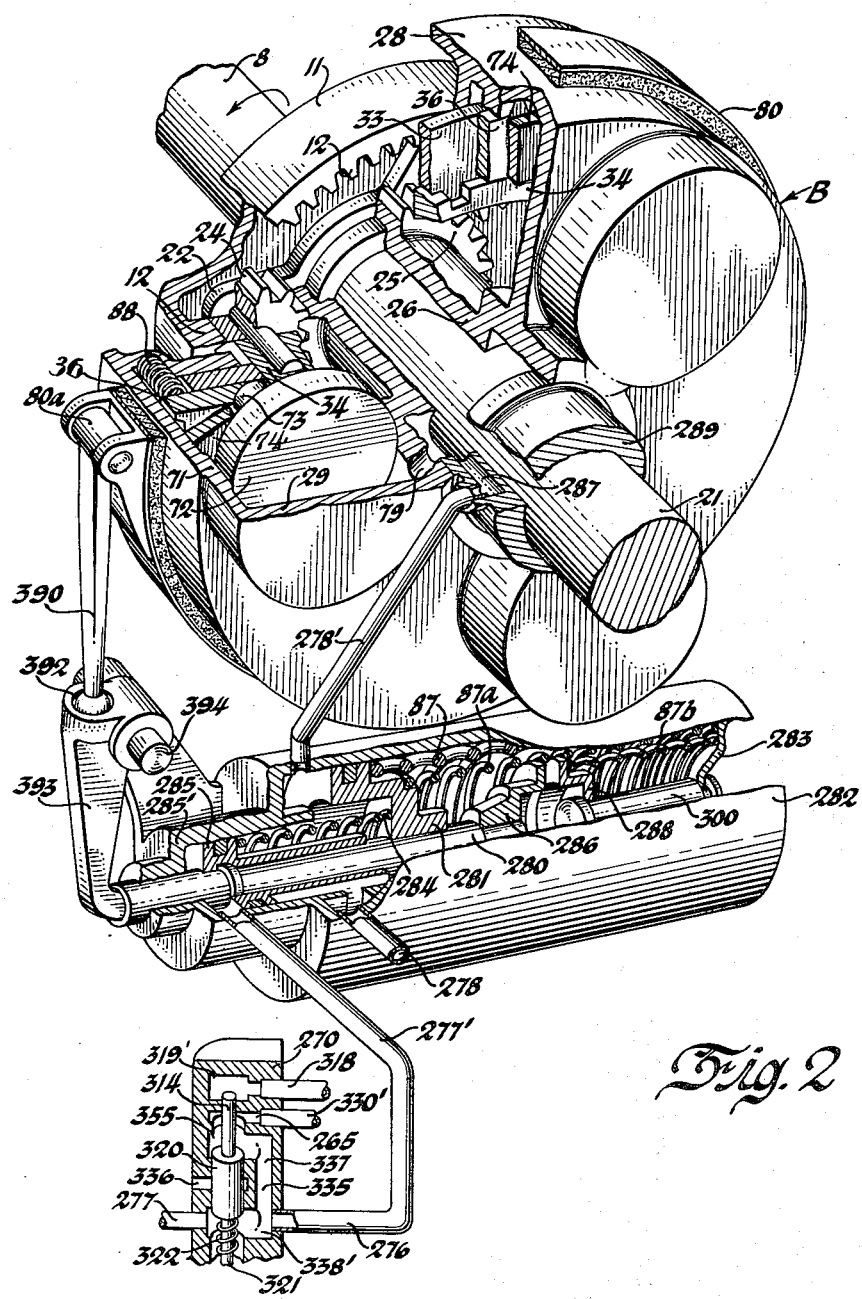
Figure 2 is an enlarged view of the forward unit of Figure 1, shown in sectioned projection.

As shown in detail in Figure 2, shaft 8 carries integral drum 11 annually toothed internally at 12 to form the input driving member for the assembly comprising planet carrier 22 affixed to shaft 21, reaction sun gear 25 and sleeve 26, and drum assembly 28—29, the planet gears 24 meshing with annulus 12 and sun gear 25.

Splined clutch hub 34, riveted to carrier 22, carries clutch plate 33 mating with plate 36 held to rotate with drum 28 and presser plate 74. Springs 88 tend to disengage plate 33—36, and pistons 72 sliding in cylindrical spaces 71 in drum portion 29 are arranged to press centering spindle 73 and presser plate 74 to overcome springs 88 and build up capacity in the clutch formed by plates 33—36. Fluid pressure is fed through external pipe 278', gland passage 287 and drilled passage 79 to load plates 33—36 to sustain direct drive in the unit constituted by the described planet gearing assembly, hereinafter designated by letter B.

The piston pins 73 transmit loading effort to presser plate 74, plates 36 and 33, the reaction being supported by the inturned flange of drum 28.

Brake 80 encircles drum 28, as shown in detail in Figure 2, to hold drum 28 and reaction sun gear 25 against rotation, whereby reduction gear drive through the gearing is made possible.

When clutch 33—36 is not driving, brake band 80 supported in the transmission casing as shown in Figure 1, is applied, holding drum 28—29, sleeve 26 and reaction sun gear 25 from rotation. With power applied from the engine to shaft 8, and annulus gear 12, the planet gears 24 rotate on their spindles, and cause planet carrier 22 to rotate at a reduced speed, imparted to shaft 21.

Figure 3:
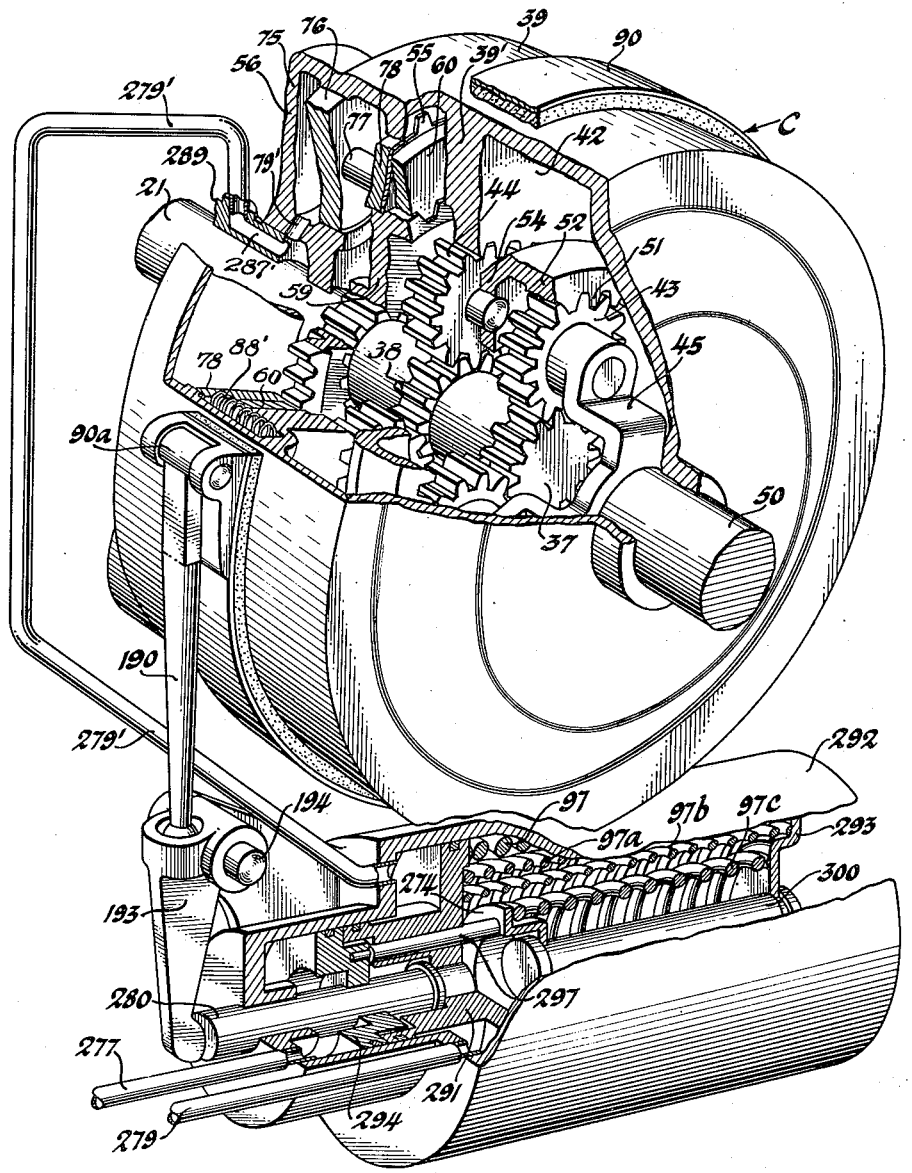
Figure 3 is a similar enlarged view of the rear unit of Figure 1.

Shaft 21 extends through unit B, to serve as the power input member for unit C shown in Figure 3 and having two driving sun gears 37—38 affixed thereto. Forward planet gears 44 meshing with sun gear 38 are rotatably mounted in carrier 54 whose drum extension 52 terminates in internally toothed annulus 51. Annulus gear 42 meshing with planets 44, is integral with plate 39' fixed to drum 39. The final output shaft 50 is integral with planet carrier 45, rotatably supporting planet gears 43 meshing with sun gear 37 and annulus 51. Clutch hub 59 splined to shaft 21 is splined externally to support clutch plate 60 mating with plate 55 carried by studs in web 39' and end wall 56 of drum 39, releasing springs 88' similar to springs 88 of Figure 2 serving the same function as springs 88 of unit B, named in this specification as the front unit. Pistons 76 may press on presser plate 78 mounted to rotate with drum 39, through rods 77, the pistons occupying cylinders 75 cut in drum web 56, affixed to section 39 and web 39'. Actuation of brake 90 of unit C is through thrust rod 190 pivoted thereto at 90a, acted on by rocker 193 pivoted to the casing at 194.

The clutches in the drawings herewith are shown schematically as of single plate type, but the invention is applicable by those skilled in the art to multiple plate constructions such as described in S. N. 45,184, filed October 16, 1935, to E. A. Thompson, now matured as U. S. 2,193,304, issued March 12, 1940.

The invention herewith is directed to controls for transmission clutches and not to clutches per se.

Fluid pressure is fed to pipe 279' to gland 289, and through passages 287' and 79' to cylinders 75, for loading plates 55—60, to establish direct drive in unit C, known in this specification as the rear unit.

Brake 90 as shown in Figure 3 encircles drum 39, and may lock it, and reaction annulus gear 42 against rotation, when reduction drive in unit C is desired, at which time clutch 55—60 is released.

Alternate operation of the actuating elements for the forward speed ratio drive of units B and C is obtained from the following tabular pattern:

| Ratio | Unit B | | Unit C | |
|---|---|---|---|---|
| | Clutch 33-36 | Brake 80 | Clutch 55-60 | Brake 90 |
| High | In | | In | |
| 3rd | | On | In | |
| 2nd | In | | | On |
| Low | | On | | On |

Figure 4:
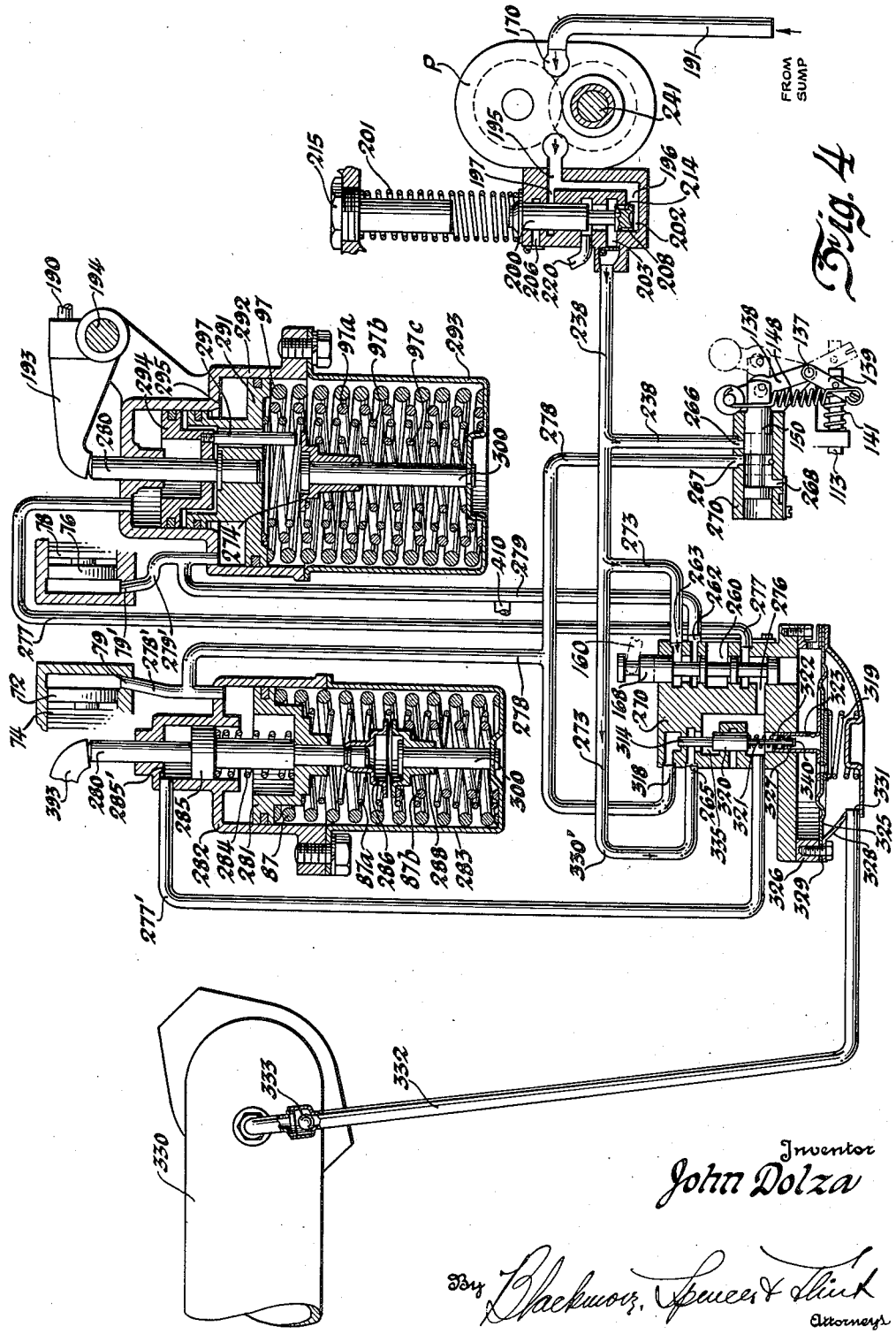
Figure 4 is a schematic view of the control and actuating mechanism of Figures 1, 2 and 3, providing detail of the valving controls and associated parts.

In Figure 4 the controls for obtaining the above shift pattern are shown schematically, as comprising two valves; the first, 150, occupying one of two positions, for admitting servo line pressure from servo main 238 and port 266 to port 267 and line 278 for actuating unit B for direct drive; or alternately for cutting off servo main 238 and releasing fluid pressure from line 278 to exhaust port 268, for establishing drive through the gearing.

Likewise valve 168 occupies one of two positions for controlling transmission unit C; the first position connecting servo line 273 and port 263 to port 262 and line 279 for establishing direct drive; and alternately cutting off line 273 while opening pipe 279 to exhaust through port 260 for establishing drive through the gearing.

Figure 5:
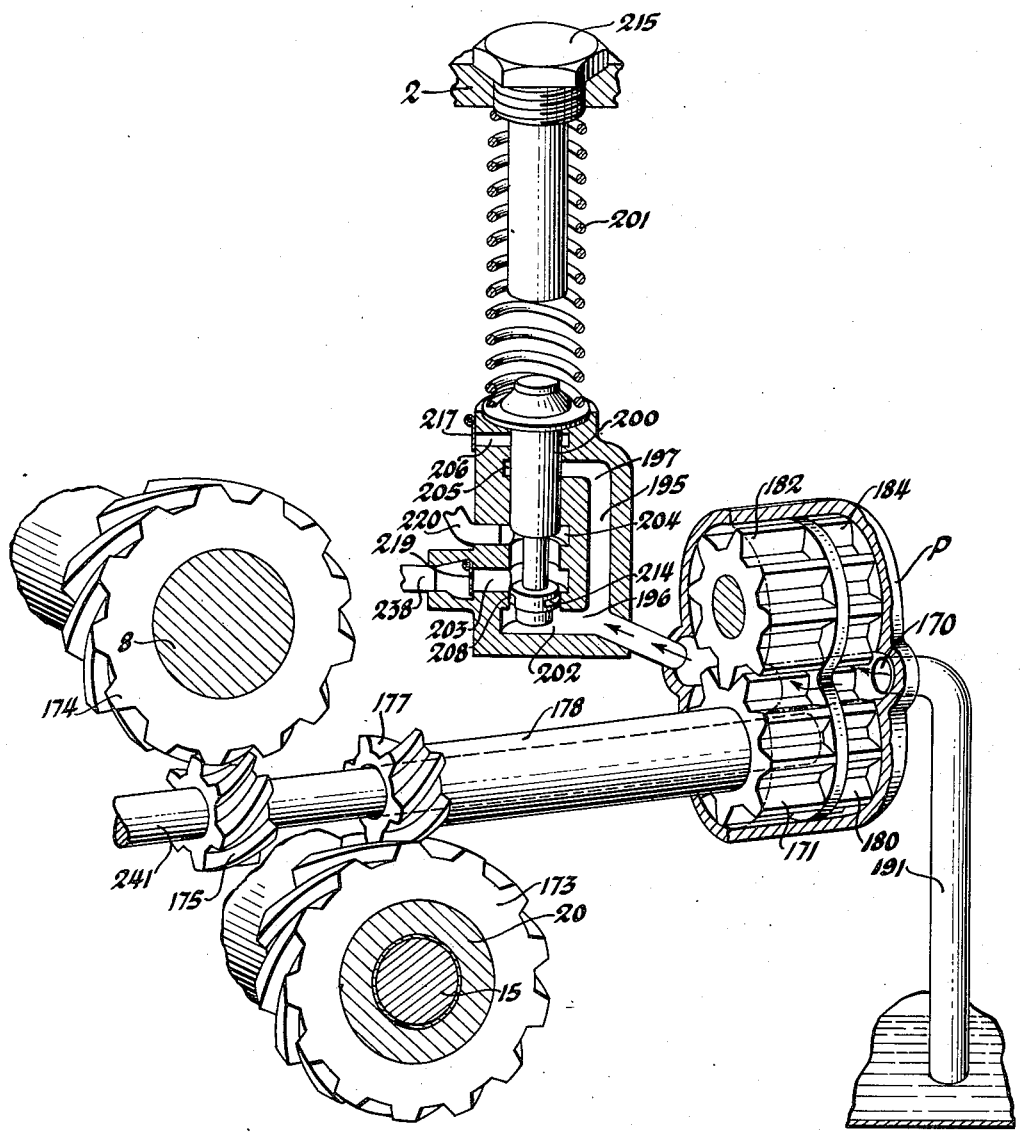
Figure 5 is an enlarged view of the servo and lubrication pump arrangement of Figure 1.

Pump assembly P, shown in Figure 1, operates continuously as long as either of shafts 5 or 8 have rotation, as will be understood by inspection of Figure 5, which shows the parts in transverse section. The main outlet from the pump is controlled by regulator valve 200, which also controls lubrication pressure to the force feed oiling system, not essential to the invention of this specification. Servo main 238 leads from the outlet pressure space of the pump assembly and from valve 200 to ports 266 and 263 of valves 150 and 168 respectively, and also through line 330' to port 265 of compensator valve 320 of Figure 4.

For convenience in assembly and manufacture, valves 150, 168 and 320 are mounted in a common valve body 270 adjacent to or integral with transmission casing 2.

As shown in Figure 4, the shift pattern of valves 150 and 168 with respect to the aforementioned shift-actuation table, is as follows:

| Ratio | Valve 150 | Valve 168 | Clutch 33-36 | Clutch 55-60 |
|---|---|---|---|---|
| High | Right | Up | In | In |
| 3rd | Left | Up | | In |
| 2nd | Right | Down | In | |
| Low | Left | Down | | |

It will be further understood that when the clutches are engaged in either or both units, the corresponding brakes for the respective groups are disengaged by the same fluid pressure which applies the clutches.

The regulator valve 200 of Figure 5 has pressure inlet ports 195 and 196 subject to lift pressure against spring 201, in ported space 202. When a given pressure head is reached, the lower boss of the valve is raised beyond port 203 leading to check valve 219 and servo main 238. At this time leakage through slots 208—214 permits flow of oil to port 204 and lubrication line 220. With a further increase in pressure the lower boss will open port 204 to full pressure, at which time the upper boss will open port 205 and line 197 to set up a balancing pressure on the upper face of the lower boss, whereafter a pressure balance between adjustable spring 201 and the pump pressure is maintained at a fairly constant pressure point, in that overpressure will blow off the surplus through exhaust port 206, and relief valve 217. The overpressure relief occurs when the lower edge of the upper boss permits flow to port 217. The primary purpose of this valve is to afford regulation to pump line servo pressure, and the secondary purpose is to move rapidly to open servo line position with the first incremental rotation of the pump. Other forms of regulating valves may be used without departing from the principles of my invention, the requirement herein being that uniform servo line pressure be sustained in servo main 238. Screw 215 adjusts tension of spring 201.

Figure 6:
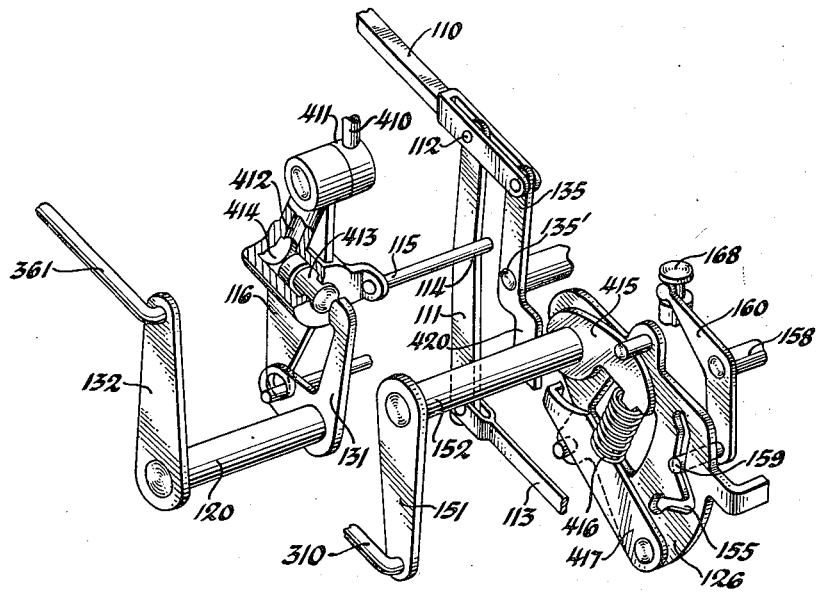
Figure 6 is an elevation section view of the mounting for the valve controls of Figure 4, and shows the external connections linking with the driver and governor connected control members of Figure 1.

As shown in Figure 6, valve 168 for unit B is positioned by pivoted bellcrank 160, movable clockwise for shifting the valve to "up" position, and counterclockwise for shifting it to "down" position. Pin 159 of member 160 intersects slot 155 of camplate 126 pivoted adjacent to the pivot 158 of member 160, so that rocking of 126 counterclockwise may cause valve 168 to move to the "down" position, according to the radial distances of points on cam slot 155 from the center of shaft 152 on which 126 may turn. External lever 151 of shaft 152 is connected to manual shifter elements 310, 109, 308, 306, 305 and hand lever 301 movable over speed ratio sector positions as indicated on the sector plate of Figure 7. Line 220 of Figures 1 and 5 transmits lubricant to the transmission unit gears and bearings. Leakage passes 208 and 214 provide initial flow of oil in the motion of valve 200. Inlet 197 feeds to port 205. Pipe 191 is the suction inlet for pump P, leading to suction space 170. Idler pump gears 182 and 184 mesh with rotor gears 171 and 180. Sleeve 178 receives drive from gear meshing with gear 173. Check valve 219 prevents too rapid flow of lubricating oil in line 238.

The inner end of shaft 152 carries affixed lever 415 pressing on spring 416, which in turn may press on piece 417 pivoted to plate 126, and thereby transmit rotational force through spring 416 to camplate 126, rocker arm 160 and valve 168. Stop pins on plate 126 prevent departure of levers 415 and 417 from the margins of camplate 126.

The hand control lever 301 may therefore shift valve 168 to a direct or to a gear drive position for the rear unit C.

In Figure 4 valve 150 receives servo pump pressure from line 238 at port 266. Valve 150 is toggle operated as shown, through toggle arms 138—139 pivoted at 137, held by spring 148, and operated by rod 113, but biased by spring 141 toward the active right-hand position. With the valve positioned as shown in dashed lines in Figure 4, pump pressure from 266 may be applied through port 267 to line 278, to actuate the elements of the brake cylinder 282 and clutch parts connected to passage 79. In the alternative full line position, valve 150 connects port 267 to the exhaust port 268, and servo port 266 is cut off.

Valve 150 is moved by automatic and manual means, as shown in Figure 6.

Automatic shifter rod 113 is pivoted at its forward end to equalizer bar 111, pivoted to governor rod 110 at 112. Idler lever 135 pivoted at 135' to valve body 270 is pivoted to rod 110 to limit the motion. Extension 420 of 135 is arranged to intersect the movement of lever 417 pivoted on camplate 126.

Cross-shaft 241 of Figures 1 and 5 is driven by gear 175 meshing with gear 174 of shaft 8. Governor weights 251 swing outward with rotation of flange 244 of shaft 241, the weight arms 260 camming sleeve 233 connected to external fork 350 against the action of governor springs 252—254, thereby rotating shaft 351 attached to the fork, and rocking lever 352 attached to the shaft and pivoted to rod 110 at 353. The governor assembly will hereinafter be noted by letter G.

It will be seen that through the described linkage, as in Figure 1, the variations in speed of shaft 8, connected to the vehicle engine when the drive is forward, will be transmitted to equalizer bar 111. The accelerator pedal 303 for the engine is connected to lever 132 affixed to shaft 120 of Figure 6 mounted to turn in the casing 2, through rod 355, lever 359, shaft 358, lever 364, and rod 361. The effective length of rod 361 may be adjustable by any commonly known means, as required for effective operation. The inner portion of shaft 120 carries affixed lever 131. Lost motion lever 116 is pivoted to the casing, and arranged to swing in a path intersecting the motion of lever 131. Lever 116 is drilled at its pivot point 411 and connecting passage 412 leads to cylindrical space 414, in which slides projecting piston 413 engaging the swinging end of lever 131.

Pressure line 410 joins pivot 411 to pressure lead 279 of the rear unit, as in Figure 4, so that whenever the rear unit is in direct drive, piston 413 couples to lever 131 by the volume of fluid existing behind the piston in cylinder 414. Pin 115 of lever 116 may engage equalizer bar 111 at notch 114.

Movement of the pedal 303 for advancing the engine throttle in the normal way through lever 359' and throttle rod 363, will at the same time exert a force through the linkage just described, upon pin 115, tending to cancel or oppose the effect of governor force from rod 110, by shifting the fulcrum point farther to the left, thereby requiring a higher governor speed for a permitted shift of valve 150 to direct drive position for the front unit B. The throttle pedal connected ratio control linkage above described will hereinafter be designated by letter T.

At the lower portion of Figure 2 is a schematic view of the assembly of control and servo devices constituting the exemplary system for my invention in which brake cylinder 282 is a housing for brake piston 281 slidable on rod 280, piston 285 attached to rod 280, springs 87, 87a, 87b; abutment 300 fixed to retainer 283, and sliding abutment 286 and 288. This assembly is for operating the brake 80 of the front unit B.

The thrust of springs 87, 87a is exerted on piston 281, and through a shoulder of rod 280, on rocker 393 pivoted to the casing 2 at 394, whereby notch 392 of rocker 393 and thrust rod 390 pivoted to brake member 80 at 80a may apply brake 80 to drum 28 of the front unit. Pressure of line 278 may relieve the spring force on brake 80 by moving piston 281 to the right in the cylinder 282, while at the same time is acting through pipe 278 to load clutch plates 33 and 36 through presser plate 74 and pistons 76 of the front unit B.

The spring forces against which the servo line pressure from 278 is required to work are of predetermined magnitude, so that the resistances felt by the pump line pressure in acting against the springs provide a scalar change in the degree of pressure exerted on the clutch plates 33—36 through pistons 72 connected to line 79 and also to 278. It will be seen that if means are provided to apply pressure in line 277 to piston 285, the resistance of the spring system to pressure from line 278 acting on piston 281 will be lessened and varied with the variation of pressure in pipe 277'.

Figures 2 and 4 show the construction of the plunger 323 operated by movement of the engine throttle pedal 303 of Figure 1 through changes induced in the degree of engine vacuum. Differential valve 320 slides in bore 319' of valve body 270, the external shell of plunger 323 being bored out internally to fit collar washer 327 slidable on adjacent end of stem 321 of valve 320. Lock ring 340 prevents washer 327 from further motion induced by tension in spring 322.

Figure 8:
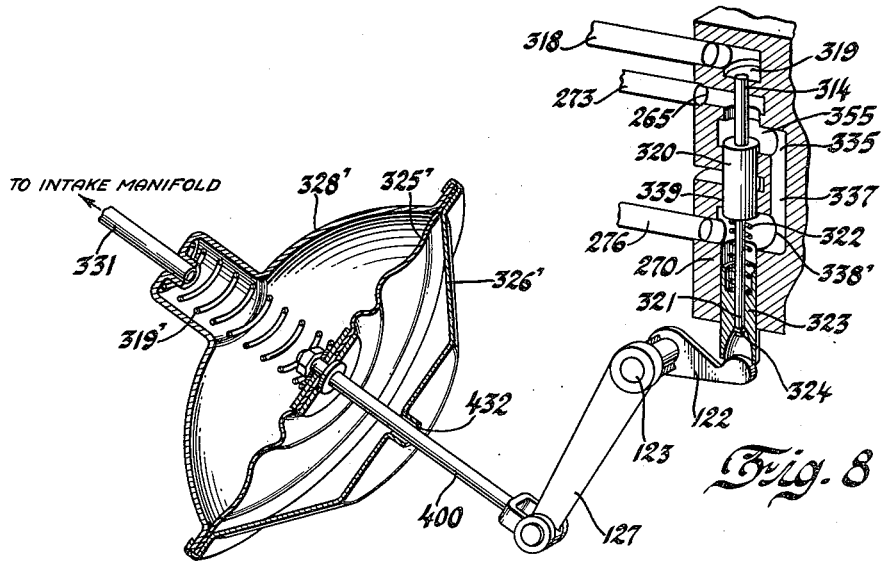
Figure 8 is a modification of the vacuum responsive means of Figure 4 used to vary the rate and degree of loading pressure on the direct drive clutches in units B and C.

The uppermost lead 318, as in Figure 8, connects the head of stem 314 to pressure line 278 of the front unit. The ported passage 265 connects to line 238 (273) receiving net pump output pressure. Ported space 335 is joined by line 276 to compensator lines 277 and 277', and cross-connected to space 338' by passage 337. Spring 322 reacts between the lower face of valve 320 and the recessed portion of plunger sleeve 323, guided by stem 321 of the valve.

With no pump pressure available in either servo line 278 or 279, brakes 80 and 90 are active to establish low speed gear drive in both of the front and rear units B and C by virtue of brake loading springs 87, 87a, 87b, and 97, 97a, 97b.

When the hand control 301 is shifted to move valve 168 to the dashed line position of Figure 4, ports 262 and 263 are no longer connected, and pressure inlet port 263 is shut off, draining line pressure from cylinder 292 controlling the brake 90 of the rear unit, through exhaust port 260. Pipe 410 joins pipe 278 to passage 412 (Fig. 6).

The compensator pressure inlet 265 is opened to space 335 and to line 276 feeding both compensator lines 277' and 277 connected to act on compensator pistons 285 and 294 of Figures 2 and 3 of the front and rear units, respectively. Balanced pressure on both ends of boss 339 of valve 320 is permitted by passage 337 and ported space 338'.

Sleeve 323 may slide in bore 319 of valve body 270 and pick up retainer collar 327 to vary the stress of spring 322, whereby the effective aperture between the upper face of boss 339 of valve 320 in space 335 is varied.

Closure of the opening between boss 339 and the seat 355 in space 335 diminishes pressure in line 276 and in connected compensator lines 277' and 277, while conversely, opening of the valve 320 allows the servo pump pressure to be exerted in both of the compensator lines. Exhaust port 336 permits oil to escape from space 355 and line 276.

Figure 7:
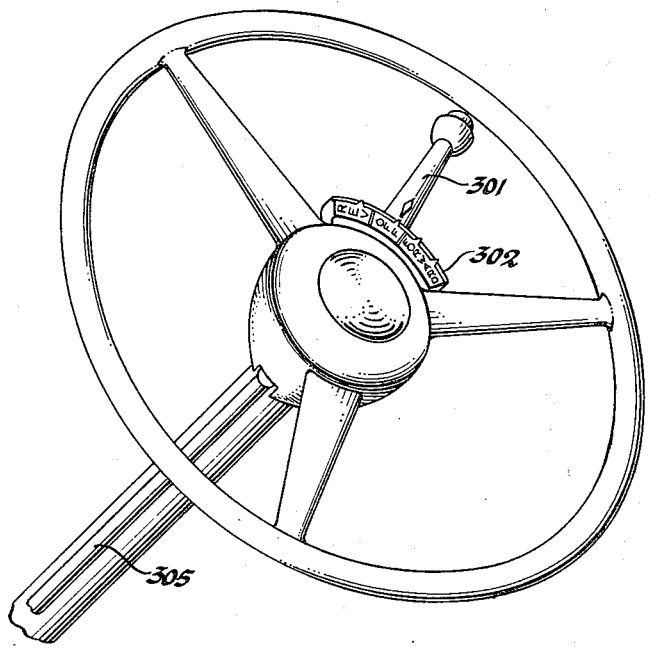
Figure 7 shows the driver selection means attached to the steering column of the vehicle, in projection view.

The hand control of Figures 1 and 7 embodies these members; lever 301, rod 305, lever 306, clevis 307, rod 308, clevis 309, rod 310 and lever 151 which may rock valve 168 through the mechanism of Figure 6. Indicator sector plate 302 shows the proper shift positions of lever 301.

The distance through which sleeve 323 may move to effect the compensation pressure in lines 277 and 277' is determined by diaphragm 325 of Figures 4 and 8 and spring 319 attached to sleeve 323, mounted in casing 326 and held therein by clamped shell 328, the casing being attached to valve body 270 by screwed flange 329. Nipple 331 in diaphragm shell 328 is connected to the engine intake manifold 330 through pipe 332 and check valve 333, so as to transmit an index of the engine torque conditions to the sleeve 323. Ring 326 is attached to body 270 and flange 329.

When the engine is stopped, there is no oil pressure acting on the valving, and no vacuum effective on diaphragm 325. The starting of the engine creates a vacuum in line 332 and inside the shell 328, drawing diaphragm 325 down, against the action of spring 319 and increasing the compensator port opening of valve 320 between ports 265 and 335. As oil pressure from pump P becomes available in line 265, the pressure may thereupon build up behind pistons 294 and 285 of the brake relieving cylinders 292 and 282.

When control valve 168 for the rear unit is moved to admit pressure from servo line 238 to line 279 in order to disengage brake 90 and apply clutch 55—60, the compensating pressure behind piston 294 due to the permitted full flow of compensation pressure by valve 320, allows the clutch pressure in line 79' to act on clutch discs 55 and 60 at a lower value than if the opposition of brake springs 97, 97a, 97b, and 97c were fully effective.

Line 279' transmits servo line pressure from cylinder 292 to clutch cylinders 75 from line 279, by way of gland passage 287' and drilling 79'. Spring 284 absorbs the first increment of motion of compensator piston 285. Strap 293 is a retainer for the springs 97.

If, however, the engine throttle be opened before the valve 168 is moved, the reduction in engine vacuum in manifold 330, allows spring 319 between shell 328 and diaphragm 325 to shift valve 320 toward closing of port 276 with respect to line 265, which reduces the compensation pressure in lines 277 and 277', thereby establishing a much higher pressure value acting on clutch pistons 76 and discs 55 and 60, through the direct resistance action of the springs 87 or 97 on the head of the fluid column of the pump. Abutment 274 transmits primary thrust of pin 297 to 97c.

The capacity of the clutch 55—60 is controlled by the degree of engaging pressure which sustains it. When, for example, the line pressure of the pump P is divided between pistons 291 and 294, and springs 97, 97a, 97b are not fully effective to establish full pump pressure on clutch pistons 76, the capacity of clutch 55—60 may have a torque value of $x$ foot pounds, at which time the full range of compensation effect may be present.

Now if compensation pressure be cut off from piston 294, the full capacity of clutch 55—60 is obtained in a very short time interval, building up to a torque value greater than $x$, or $x+v$. Minute changes in between these pressure and capacity levels are therefore predetermined by variations in the degree of engine vacuum, as created by the driver's opening and closing of the engine throttle, and by the driving conditions which likewise affect the variation of engine vacuum.

Likewise, referring back to Figure 2, compensator pressure in line 277' is exerted on compensator piston 285 of the servo actuator for the front unit.

Conversely, when the car driver advances the engine throttle, the degree of vacuum in manifold 330, pipe 332, and shell 328 diminishes, whereupon spring 319 tends to shift diaphragm 325 and valve 320 to closed position, wherein the compensation pressures being no longer sustained, the full pump pressure may build up in lines 278 and 279, according to which of valves 150 or 168 is moved to its direct drive compelling position.

The gradual change of degree of vacuum under these circumstances may be applied to graduation of the opening of compensator valve 320, in a series of infinitely small steps, which translated into pressure effect upon clutches 33—36 and 55—60, provides an exceedingly smooth engaging action, so that there are no discernible lurches or jerks in the engagement of either clutch involved in a speed ratio shift sequence, in either ascending or descending ratio changes.

In Figure 8 the compensator valve 320 of Figure 4 is moved by spring 322, sleeve 323, and arm 122 of shaft 123 mounted in valve body 270. Shaft 123 projects externally from body 270, and is rocked by attached lever 127 pivoted to diaphragm rod 400 attached to diaphragm 325' mounted in casing 326' and shell 328', whose extension carries nipple 331 and affords a seat for spring 319' bearing against the diaphragm. Rod 400 is a loose fit at port 432 in shell casing 326' so that if desired, the release or intake of air in the compartment between diaphragm 325' and casing 326' may be regulated to dampen or to increase the sensitivity of the action of the vacuum from manifold vacuum lead 332 on the compensator valve 320.

The center of shaft 123 is so taken with respect to the center of valve 320 and plunger 323, that rapid initial motion followed by slower motion in the stroke of plunger 323 with respect to variation of vacuum upon diaphragm 325', may be obtained.

If converse action is required, the center of 123 is located above the point of contact of 122 with 323. This expedient makes it possible to extend the use of my invention to a wide range of power plant installations wherein torque responsive control conditions with respect to available power and load to be driven are widely different from those experienced in customary passenger car practise.

The purpose of this control is to proportion the rate of clutching engagement or capacity change to the degree of torque demand existing at the interval when the clutch is selected to drive.

If the torque demand is falling off during the clutch engagement interval, the full pressure available from the servo pump might become effective before the relative rotations and inertias of the parts had diminished in accordance, whereupon the clutch connected elements would be joined quickly at full loading capacity. This would administer a shock to the transmission system, and cause a lurch of the vehicle, since the absorption period for momentary differences in torque at the clutch discs is very short.

At this point, the vacuum responsive valve 320 interposes the diminishing torque demand factor, and the rise in engine vacuum moves diahragm 325 to compel compensator valve 320 to shift toward an opening position, wherein increasing compensation values operating on compensating pistons 285 and 294 are obtained.

The first increment of accelerator pedal motion from idling causes the degree of vacuum in manifold 330, pipe 332 and shell 328 to decrease, permitting spring 319 to load light spring 322, so as to oppose the force of fluid pressure acting on the upper face of valve 320. This results in a graduating of the orifice between the lower lip of port 335 and the upper face of valve 320, restricting the pressure flow from space 334 to outlets 276—277, available to create pressure on compensating piston 294 in the cylinder space between abutment wall 295 in cylinder 292.

At full accelerator pedal position the existing degree of vacuum is opposed by spring 319 to an extent such that the end of stem 321 meets the inner end wall of plunger 323, and positive closure of the flow from space 338 to piston 294 may occur.

Figure 9:
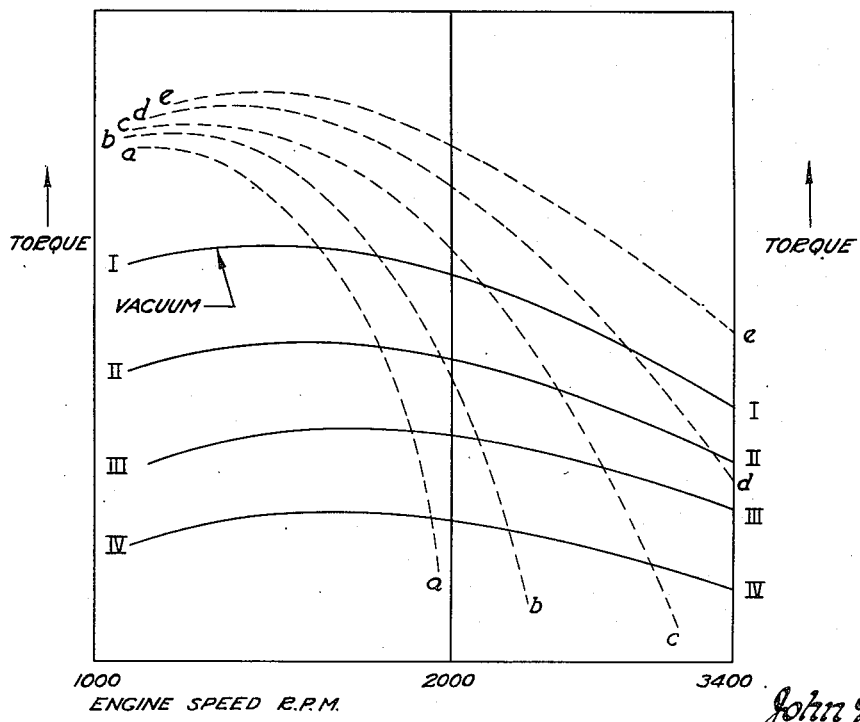
Figure 9 is a chart illustrating in heavy line the form of the control characteristics provided by the vacuum response of the mechanism of Figures 4 and 8.

The chart of Figure 9 provides a series of characteristic internal combustion engine torque curves for varying conditions of engine speed, throttle opening and degree of engine intake manifold vacuum.

The dashed lines represent the engine torques at different engine speeds at given throttle openings, as follows:

| Curves | Throttle |
| --- | --- |
| a-a | Partial. |
| b-b | Quarter. |
| c-c | Half. |
| d-d | Three-quarters |
| e-e | Full. |

It will be noted that these curves fall off rather sharply with increased speed.

The full line curves represent the engine torques at different engine speeds at given degrees of engine intake manifold vacuum, diminishing with torque from curves I to IV. These curves are relatively flat and yield a close approximation to the torque values.

This set of curves demonstrates the utility of my invention in providing a uniformly varying change of degree of vacuum with torque, from which resultant force, the coordinate applications of Figures 4 and 8 are obtained. The close agreement of the vacuum values with the engine torque makes the application of my invention a practical utility, and yields an instant response when operating over highways in territories of considerable gradient, so that the ratio shifting clutches are provided, with a torque capacity in close accordance with the actual need.

The arrangement of gearing, clutching and braking shown herewith, provides a ratio shift sequence in which during forward drive, the transitions from one ratio to another always occur with a given mean torque value between input and output. In other words, at no time in forward speed drive is there a neutral, or no-drive condition while ratio is being shifted. The overlapping of torque among the shifter elements such as the clutches and brakes used in the illustration provides an extremely smooth method of passing through the transmission shift intervals, but practice has disclosed that supplementary means to adjust the torque capacity of the clutches about the take up drive, in accordance with the existing torque demand is required in order to absorb the existing inertias of the rotating parts, and to avoid abuse of the friction members which have to carry the torque.

It has been shown in the clutch art that regulation of the rate of clutching engagement by varying the position of the engine throttle provides a certain control over the smoothness of clutching action, but this, however, has been applied to friction clutches pre-biased for driving, the control being upon the permitted rate of engagement. In my invention the ratio shifting clutches are pre-biased for disengagement, and I superimpose my method upon a system in which automatic and manual controls not only initiate the clutching action but also apply a given rate of pressure build-up to establish a predetermined torque capacity level for the clutch or clutches involved.

The end point of the clutching action on the rising pressure phase of the clutch control cycle is thereby determined by the torque demand of the driver as expressed by the movement of the engine accelerator pedal, and further modified by the driving conditions, in that the degree of engine intake manifold vacuum varies with both characteristics.

The invention further equilibrates the forces derived from predetermined throttle opening and driving conditions against a spring, for example, item 319 of Figure 4, of given rate, and likewise against a predetermined fluid pressure force acting in opposition upon valve 320, so that for the range of movement of the compensating control, an extremely fine adjustment of the fluid pressures acting on the clutches 33—36 and 55—60 is obtained. This method is in no way sensitive to wear of the clutches, in that pressure of the constantly operating pump is always available to take up slack due to wear, by creating a volume increment of corresponding value.

Variations in viscosity of the fluid used in the system can only affect the friction of valve 320 in bore 319', the fluctuations of viscosity being of magnitudes of less effect than the calculated forces available from vacuum line 332, diaphragm 325, spring 319, spring 322, and pressure lines 265 and 318.

Among the structures to which the present invention is applicable are those described and shown in the publication known in the automotive trade as "Automotive Industries," for May 29, 1937, on pages 806 to 809 and 823.

Thus I have provided a novel driving mechanism and control which is effective to achieve the objects above enumerated, which possesses advantages in manufacture and servicing, and which is adaptable to a wide variety of use and applications. For example the system shown is useful for driving rail cars, aircraft propellers, superchargers for induced air combustion draft, tractors, farm and excavating machinery. Wherever a drive between a variable speed and power engine and a variable load is required the demonstration of my invention is applicable.

It is herewith acknowledged that changes from my construction and arrangement of parts will suggest themselves to those skilled in the art, but it is understood that such means are within the scope of the invention herein disclosed and as defined in the appended claims.

I claim:

1. In automatic variable speed mechanisms, in combination, an engine, a speed control for said engine, multiple variable speed gearing driven by said engine and connected to a load, multiple friction devices arranged to establish different driving speed ratios within said gearing including direct driving coupling clutches, fluid pressure means effective to engage and hold said clutches engaged, valving controlling said means, and a device responsive to engine vacuum interposed between said valving and said engine speed control operative to regulate the rate of engagement of said clutches according to the advanced or retarded positioning of said speed control.

2. In variable speed controls, in combination, an engine, a speed control for said engine, multiple variable speed gearing driven by said engine actuable by fluid pressure means, a valve controlling one unit of said gearing movable into two positions, one for admitting fluid pressure to, and the other for releasing fluid pressure from said means, a second valve controlling by-passed fluid from said first named valve, and a device responsive to engine vacuum interposed between said speed control and said second named valve whereby the degree of pressure released by said second valve is regulated in part by the position of said speed control.

3. In combination, a throttle controlled engine, a power transmission system embodying a fluid pressure actuated clutch for establishing changes in speed ratio, a speed ratio control mechanism operatively connected with said system comprising, means constantly responsive to said throttle position, said means including mechanism jointly operative with a speed governor, a control device effective upon said clutch subject to variations in the degree of engine vacuum, and means coincidentally operative with said engine throttle to vary the effective rate of engagement of said clutch.

4. In step-gear transmissions embodying gradually engageable friction devices, in combination with automatic speed ratio changing mechanism, a movable control element including means responsive to variation in speed of the motor, means responsive to variations in torque demand upon said motor, and additional means responsive to variations in engine torque operative upon additional mechanism arranged to change the rate of engagement of said devices during the ratio shift intervals established by said automatic speed ratio changing mechanism.

5. In automatic controls for motor driven vehicles, in combination, an engine, a driving shaft, a driven shaft, a variable speed transmission arranged between the shafts for multiplying torque and embodying fluid pressure sustained clutch elements, an automatic control device therefor including a governor responsive to the speed of one of the shafts, operator controlled means connected to said device and operative to influence governor selection of speed ratio, said means coincidentally controlling said engine speed, and additional means controlled proportionally in accordance with movement of said first named means, operative to vary the rates of engagement of said clutch elements for predetermined torque operating conditions.

6. In automatic velocity controls for motor vehicles, in combination, a transmission speed ratio control element, speed responsive means continuously operative to influence the motion of said element, means varying with engine torque jointly operative to influence the motion of said element, and additional means controlled by said last named means, effective to modify the rate of change of established drive for predetermined power and load conditions.

7. In automatic velocity control systems for motor vehicles, a continuously operative speed ratio control element, fluid pressure actuated speed ratio changing mechanism connected to said element, speed responsive means operative to influence the motion of said element, means responsive to engine torque operative to influence the motion of said element, and additional operator controlled means arranged to modify the rate of change from one speed ratio to another according to predetermined conditions of load and speed.

8. In combination with a variable speed transmission mechanism embodying fluid pressure sustained clutch elements, a drive shaft and a driven shaft, means responsive to variations in speed of one of the shafts and controlling the operation of said mechanism, engine vacuum actuated means for controlling the rate of engagement of at least one clutch element, and manually actuated means operative with said first named means to modify the action of said speed responsive device.

9. In change speed transmissions for motor vehicles, a variable speed gearbox, a fluid pressure sustained clutch device capable of occupying an operative and a non-operative position, for different speed ratio settings of said gearbox, locking means for automatically engaging said device in operative position, manually controlled means for releasing said holding means, and means responsive to the degree of engine vacuum effective to vary the degree of pressure sustaining said device.

10. In variable speed mechanism for motor vehicles, in combination, an engine, a throttle control for said engine, a driving shaft, a driven shaft, a variable speed gearing arranged between said shafts including a friction clutch for coupling the shafts to rotate at the same speed, gear driving means for connecting the shafts to rotate at relative speeds, fluid pressure means for actuating the clutch simultaneously operative to release drive through said second named means, and valving subject to variations in engine vacuum in accordance with motion of said throttle effective to vary the clutch capacity according to torque demand as determined by the position of said throttle.

11. A plurality of variable speed ratio transmission units arranged to transmit drive between an engine and a load, a multiplicity of friction torque sustaining elements adapted to provide forward drive in said units at selected speed ratios, servo means operative to sustain drive by certain of said elements while withholding drive by certain others of said elements, a speed responsive device connected to said servo means, control means coacting with said device arranged to transfer drive from said first named elements to said second named elements and reversely according to relative coacting forces between said means and said device, and an auxiliary vacuum responsive control effective to vary the torque capacity of said first named elements when said servo means is made selectively operative by said occasion.

12. A driving and a driven shaft, a friction clutch comprising two members arranged to establish drive therebetween, engagement and disengagement means for said clutch, control mechanism for said means, means arranged to establish positive geared drive between said shafts when said clutch is disengaged, responsive to changes in engine vacuum, and a device operative to proportion the torque capacity according to predetermined conditions of load and speed of driving said shaft.

13. In power transmission controls, in combination, variable speed gearing, a friction clutch associated with said gearing arranged to be actuated by fluid pressure, engagement rate control means for said clutch including a conoidal spring resistance, an auxiliary yielding means subject to fluid pressure, and a valve controlled by variations in engine torque to regulate the rate of actuation by said fluid pressure.

14. In variable speed gearing control for automotive vehicles, in combination, a plurality of geared step-ratio transmission units arranged to connect a power source and a load, a plurality of clutches adapted to change the speed ratios of drive of said units, fluid pressure means effective to shift drive to and from said clutches and thereby change speed ratio, and control mechanism for said means operative to vary the rate of transfer from one ratio to another according to predetermined condition of engine torque.

JOHN DOLZA.